United States Patent
Sakamoto et al.

(10) Patent No.: US 11,001,271 B2
(45) Date of Patent: May 11, 2021

(54) DRIVE ASSISTANCE DEVICE

(71) Applicant: HONDA MOTOR CO., LTD., Tokyo (JP)

(72) Inventors: Naohiro Sakamoto, Wako (JP); Shotaro Odate, Wako (JP); Naotaka Kumakiri, Wako (JP); Masaru Kanda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 16/317,192

(22) PCT Filed: Jul. 12, 2016

(86) PCT No.: PCT/JP2016/070509
§ 371 (c)(1),
(2) Date: Jan. 11, 2019

(87) PCT Pub. No.: WO2018/011872
PCT Pub. Date: Jan. 18, 2018

(65) Prior Publication Data
US 2019/0241195 A1    Aug. 8, 2019

(51) Int. Cl.
*B60W 50/029* (2012.01)
*B60W 50/04* (2006.01)
(Continued)

(52) U.S. Cl.
CPC .......... *B60W 50/029* (2013.01); *B60W 30/12* (2013.01); *B60W 30/14* (2013.01);
(Continued)

(58) Field of Classification Search
CPC .. B60W 50/029; B60W 30/14; B60W 30/165; B60W 50/04; B60W 30/12;
(Continued)

(56) References Cited

U.S. PATENT DOCUMENTS

2017/0349185 A1* 12/2017 McNew .................. B60Q 9/00
2018/0148072 A1*  5/2018 Kamiya ............. G06K 9/00832
(Continued)

FOREIGN PATENT DOCUMENTS

JP    H10-76964 A      3/1998
JP    H1076964 A   *  3/1998
(Continued)

OTHER PUBLICATIONS

English Translation_JPH1076964A (Year: 1998).*
(Continued)

*Primary Examiner* — Peter D Nolan
*Assistant Examiner* — Ashley L Redhead, Jr.
(74) *Attorney, Agent, or Firm* — Carrier Blackman & Associates, P.C.; Joesph P. Carrier; Jeffrey T. Gedeon

(57) ABSTRACT

Provided is a drive assistance device for a self-driving car with which drive assistance is less liable to be deactivated, even if an abnormality of a monitoring device for monitoring a state of a driver occurs. A device checking ECU checks whether a plurality of monitoring devices for monitoring the state of the driver are normal or abnormal. On the basis of the check result, an assistance degree determination unit (function availability determination unit) determines a use degree (availability) of a plurality of drive assistance functions (ACC function, LKAS function, and ALC function) including an ACC function. Drive assistance effected by a vehicle with respect to the driver is therefore less liable to be deactivated.

2 Claims, 7 Drawing Sheets

(51) Int. Cl.
*B60W 30/12* (2020.01)
*G08G 1/16* (2006.01)
*B60W 30/14* (2006.01)
*B62D 6/00* (2006.01)
*G08G 1/09* (2006.01)
*B60W 30/165* (2020.01)

(52) U.S. Cl.
CPC .......... *B60W 30/165* (2013.01); *B60W 50/04* (2013.01); *B62D 6/00* (2013.01); *G08G 1/09* (2013.01); *G08G 1/16* (2013.01); *B60W 2050/0295* (2013.01)

(58) Field of Classification Search
CPC ... B60W 2050/0295; G08G 1/16; G08G 1/09; B62D 6/00
See application file for complete search history.

(56) References Cited

U.S. PATENT DOCUMENTS

| | | | | |
|---|---|---|---|---|
| 2018/0162390 | A1* | 6/2018 | Miura | B62D 6/00 |
| 2018/0225963 | A1* | 8/2018 | Kobayashi | G08G 1/04 |
| 2019/0061772 | A1* | 2/2019 | Prinz | A61B 5/747 |

FOREIGN PATENT DOCUMENTS

| | | | |
|---|---|---|---|
| JP | 2007-168720 A | | 7/2007 |
| JP | 2014-106854 A | | 6/2014 |
| JP | 2014106854 A | * | 6/2014 |

OTHER PUBLICATIONS

English Translation_JP2014106854A (Year: 2014).*
PCT/ISA/210 from International Application Publication of PCT/JP2016/070509 with the English translation thereof.

* cited by examiner

FIG. 3

| IMAGE SIGNAL Si | | EXAMINATION RESULT OF DRIVER CAMERA | IMAGE | MONITORING RESULT FROM DRIVER CAMERA |
|---|---|---|---|---|
| PRESENT | LEVEL IS WITHIN PREDETERMINED RANGE | NORMAL | FACE DIRECTION OR THE LIKE | SUITABLE |
| | | | | NOT SUITABLE |
| | LEVEL IS SATURATED OR INSUFFICIENT | ABNORMAL | | NOT SUITABLE |
| ABSENT | | ABNORMAL | | NOT SUITABLE |

FIG. 5

| FREQUENCY f OF TOUCH SIGNAL St | EXAMINATION RESULT OF TOUCH SENSOR | MONITORING RESULT FROM TOUCH SENSOR |
|---|---|---|
| ft (CONTACT FREQUENCY) | NORMAL (GRIPPING) | SUITABLE |
| fnt (NON-CONTACT FREQUENCY) | NORMAL (NON-GRIPPING) | NOT SUITABLE |
| fab (OTHER THAN ft AND fnt), INCLUDING ABSENCE OF TOUCH SIGNAL St | ABNORMAL (REGARDED AS NON-GRIPPING) | NOT SUITABLE |

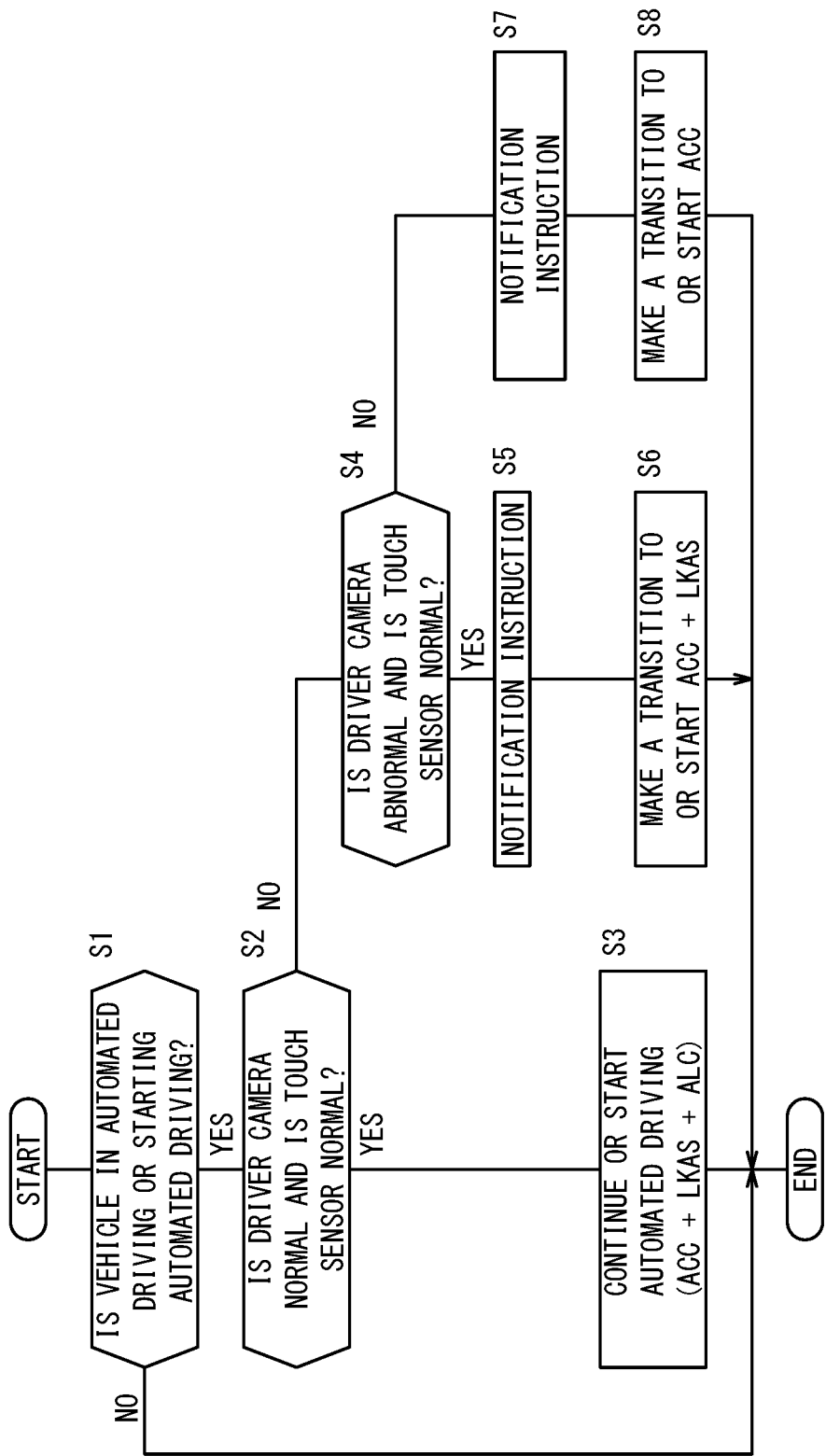

DRIVE ASSISTANCE DEVICE

TECHNICAL FIELD

The present invention relates to a driving assistance device (drive assistance device) that is suitably applied to a vehicle having driving assistance functions that assist a driver in driving the vehicle, such as an inter-vehicle distance control function, a lane keeping function, and an automated lane change function, for example.

BACKGROUND ART

In recent years, an automated driving vehicle including a plurality of function devices that assist a driver in driving the vehicle has been suggested.

For example, Japanese Laid-Open Patent Publication No. 2007-168720 discloses a technique where, in an automated driving vehicle that reduces a burden of a driver in driving, a steering assistance process is prohibited when it is recognized that steering torque by the driver who grips a steering part has decreased, that is, driving intention of the driver has decreased (in the paragraphs [0059], [0062] in Japanese Laid-Open Patent Publication No. 2007-168720).

SUMMARY OF INVENTION

In such an automated driving vehicle, a prerequisite of the driving assistance is that a driver is in what is called the driver-in-the-loop state (where the driver monitors the periphery) as a result of monitoring the state of the driver in the vehicle.

In this case, it is preferable that the monitoring of the state of the driver is performed using a plurality of monitoring devices from the viewpoint of improving certainty of the monitoring.

However, in a case where one monitoring device among the monitoring devices becomes abnormal, if an automated driving control device determines that it cannot be recognized that the driver is in the driver-in-the-loop, all the function devices are disabled and the driving assistance is cancelled. In this case, the convenience and the merchantability are decreased drastically.

The present invention has been made in view of such a problem, and an object is to provide a driving assistance device for an automated driving vehicle in which driving assistance is cancelled less easily even if a monitoring device that monitors a state of a driver becomes abnormal.

A driving assistance device according to the present invention includes: a plurality of monitoring devices that are provided for a vehicle and configured to monitor a state of a driver; a device examination unit configured to examine whether the monitoring devices are normal or abnormal; and an assistance degree determination unit configured to determine a degree of possible assistance of driving assistance function that assists a driving operation of the driver on a basis of an examination result from the device examination unit.

According to the present invention, the device examination unit examines whether the monitoring devices that monitor the state of the driver are normal or abnormal. On the basis of the examination result, the assistance degree determination unit determines the degree of the possible assistance of the driving assistance functions. Therefore, the driving assistance by the vehicle for the driver is cancelled less easily so that the merchantability of the vehicle can be improved.

In this case, it is preferable that the monitoring devices configured to monitor the state of the driver include a driver camera configured to photograph the driver, and a touch sensor that is provided for a steering part operated by the driver.

The state of the driver can be accurately monitored by the driver camera that photographs the driver and the touch sensor that is provided for the steering part to be gripped and operated by the driver.

The driving assistance functions may include an automated driving function that automatically controls steering and acceleration and deceleration of the vehicle, and the assistance degree determination unit may be configured to determine that the automated driving function can be used when the device examination unit determines that both the driver camera and the touch sensor are normal.

If both the driver camera and the touch sensor are normal, the automated driving function that automatically controls the steering and the acceleration and deceleration of the vehicle can be used. Therefore, the automated driving function can be performed in a state where a desired driver's state detection function is secured.

On the other hand, the driving assistance function may include at least one of a lane keeping function and a low speed following automated traveling function, and the assistance degree determination unit may be configured to determine that at least one of the lane keeping function and the low speed following automated traveling function can be used when the device examination unit determines that at least the touch sensor is normal.

If at least the touch sensor is normal, the lane keeping function or the low speed following automated traveling function can be used. Therefore, even if the driver camera is abnormal, for example, the lane keeping function or the low speed following automated traveling function can be performed, whose desired driver's state detection function is not affected.

Note that if the driving assistance functions include an inter-vehicle distance control function that controls an inter-vehicle distance from a preceding vehicle, the assistance degree determination unit may be configured to determine that the inter-vehicle distance control function can be used even when the device examination unit determines that one of or both the driver camera and the touch sensor are abnormal.

Even if it is determined that one of or both the driver camera and the touch sensor are abnormal, the inter-vehicle distance control function that can operate without depending on a driver's state detection result can be used.

Therefore, the convenience can be improved.

BRIEF DESCRIPTION OF DRAWINGS

FIG. 3 is an examination/monitoring result determination table of a driver camera that is stored in a storage device of a device examination ECU of the vehicle;

FIG. 5 is an examination/monitoring result determination table of the touch sensor that is stored in the storage device of the device examination ECU of the vehicle;

FIG. 6 is a flowchart that is used for describing an operation of the vehicle including the driving assistance device according to the embodiment.

DESCRIPTION OF EMBODIMENT

Detailed description is hereinafter given concerning a preferred embodiment in a relation between a driving assistance device according to the present invention and a vehicle that includes the driving assistance device with reference to the attached drawings.

[Structure]

Figure 1:
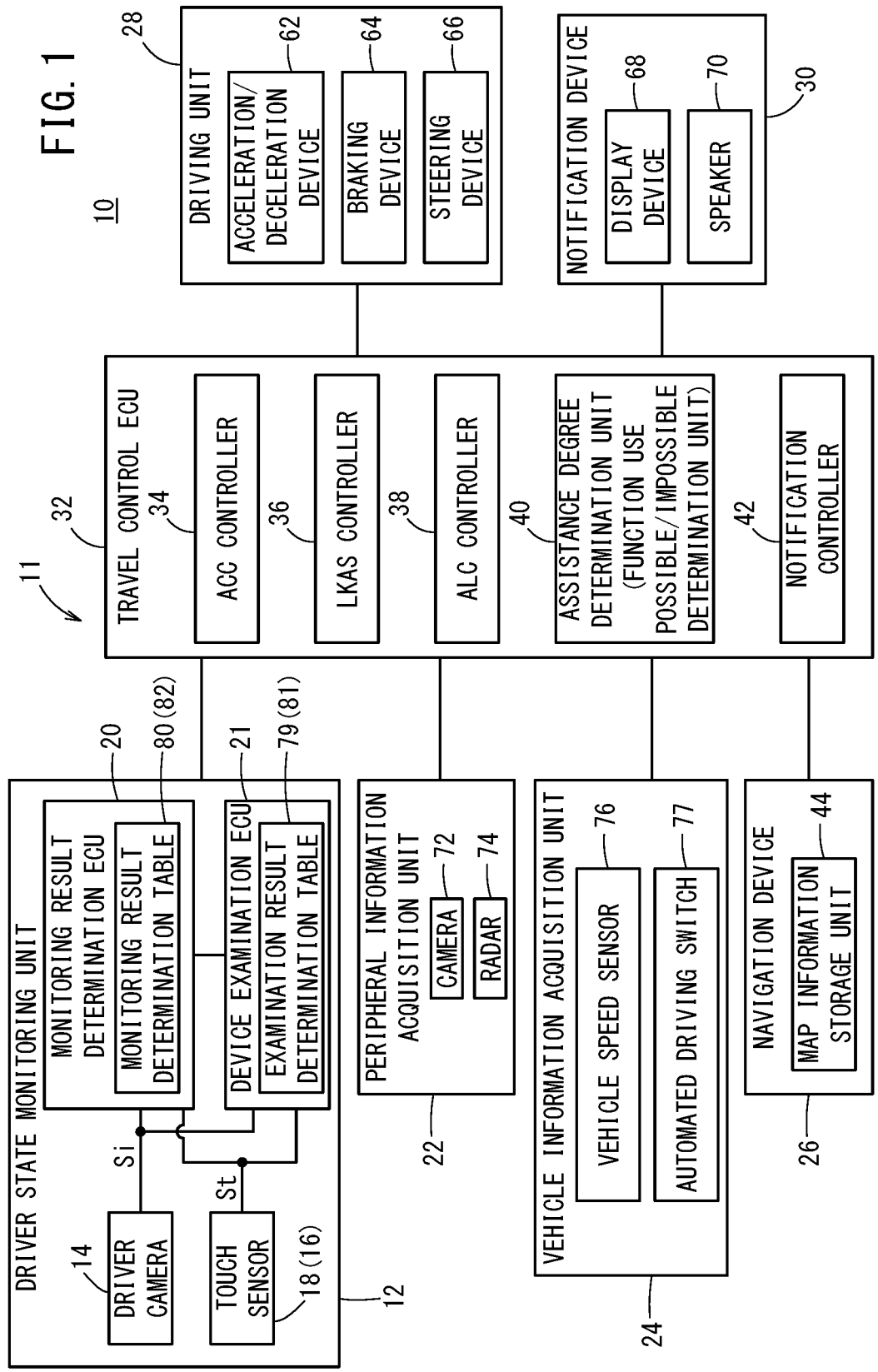
FIG. 1 is a block diagram that illustrates a schematic structure of a vehicle including a driving assistance device according to an embodiment.

FIG. 1 is a block diagram that illustrates a schematic structure of a vehicle (also referred to as an own vehicle) 10 including a driving assistance device 11 according to an embodiment.

The driving assistance device 11 basically includes a driver state monitoring unit 12 and a travel control ECU 32.

Figure 2:
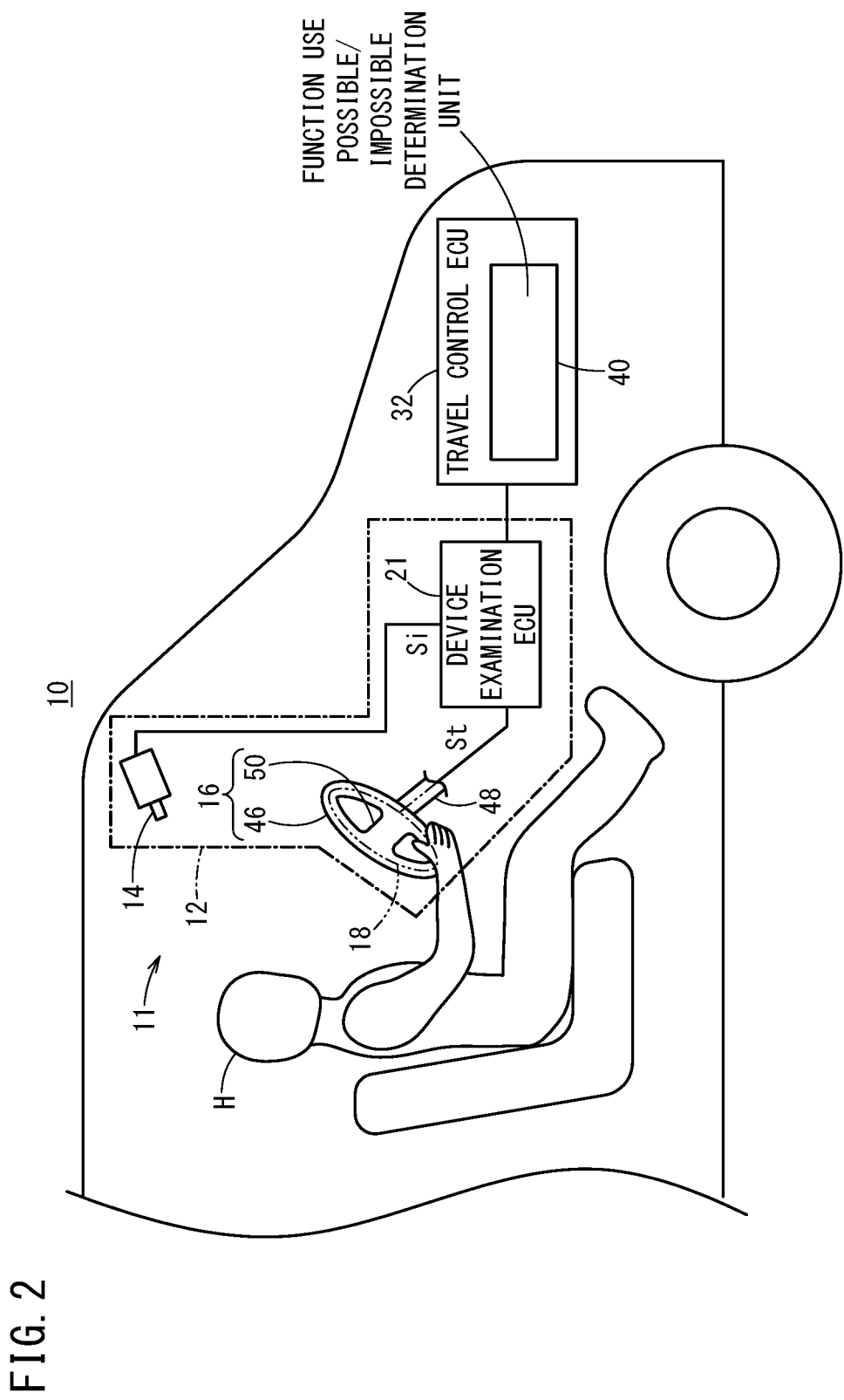
FIG. 2 is a schematic diagram that illustrates a structure of a driver state monitoring unit that monitors a state of a driver in the vehicle.

FIG. 2 is a schematic diagram that illustrates a structure of the driver state monitoring unit 12 that monitors the state of a driver H in the vehicle 10.

The driving assistance functions by the vehicle 10 include, for example, an inter-vehicle distance control function (ACC function), a lane keeping function (LKAS function or LKS function), an automated lane change function (ALC function), and the like that are performed by combining an automated acceleration and deceleration operation, an automated braking operation, and an automated steering operation. The vehicle 10 having these driving assistance functions is configured so that the driving assistance functions can operate while the driver state monitoring unit 12 determines that the state of the driver H is normal, that is, the driver H is in what is called the driver-in-the-loop state (where the driver monitors the periphery).

As illustrated in FIG. 2, the driver state monitoring unit 12 includes, as monitoring devices for monitoring the state of the driver H, a driver camera (driver photographing device) 14 provided between an upper part of a rearview mirror (not shown) and a roof, and a touch sensor (contact sensor) 18 provided for a steering wheel 16. Note that the driver camera 14 may be provided in a dashboard.

The driver state monitoring unit 12 includes a monitoring result determination ECU 20 (monitoring result determination electronic control unit) as a monitoring result determination unit for the state of the driver H, and a device examination ECU (device examination electronic control unit) 21 that examines whether each monitoring device of the driver camera 14 and the touch sensor 18 operates normally (whether each monitoring device is abnormal).

Note that an ECU (electronic control unit) is a computer including a microcomputer, and includes a CPU, a ROM (including EEPROM), and a RAM, and moreover an input/output device such as an A/D converter and a D/A converter, a timer as a clocking unit, and the like. The ECU functions as various function achieving units such as a controller, a calculation unit, a processing unit, and the like when the CPU reads out programs recorded in the ROM and executes the programs. The function achieving unit can be formed by hardware (function achiever).

The monitoring result determination ECU 20 and the device examination ECU 21 may be combined into one ECU.

As illustrated in FIG. 1, the vehicle 10 includes, in addition to the driver state monitoring unit 12, a peripheral information acquisition unit 22, a vehicle information acquisition unit 24, a navigation device 26, a driving unit 28 (an acceleration and deceleration device 62, a braking device 64, and a steering device 66), a notification device 30 (a display device 68 and a speaker 70), and the travel control ECU (travel control electronic control unit) 32.

In this embodiment, the travel control ECU 32 includes an adaptive cruise control controller (ACC controller) 34 that plays a role of the inter-vehicle distance control function (ACC function), a lane keeping system controller (LKAS controller) 36 that plays a role of the lane keeping function (LKAS function), and an automated lane change controller (ALC controller) 38 that plays a role of the automated lane change function (ALC function) corresponding to controllers that control the plurality of driving assistance functions.

The travel control ECU 32 includes, in addition to the ACC controller 34, the LKAS controller 36, and the ALC controller 38, an assistance degree determination unit (function use possible/impossible determination unit) 40, and a notification controller 42. The assistance degree determination unit 40 determines the degree of possible assistance by these automated assistance functions (usable or not) on the basis of an examination result from the device examination ECU 21.

Note that, as it has been commonly known, the inter-vehicle distance control function (ACC function) is a function to enable travel while a constant inter-vehicle distance from a preceding vehicle is kept (to control inter-vehicle distance from the preceding vehicle), and the lane keeping function (LKAS function) is a function to recognize a travel lane of the own vehicle 10 and to maintain the traveling in the travel lane. If the own vehicle 10 traveling in a road including a plurality of traffic lanes will change the traffic lane, the automated lane change function (ALC function) is operated in a predetermined period after a direction indicator is turned on. If it is determined that there is no vehicle around the own vehicle 10, the automated lane change function causes the own vehicle 10 to change the lane within a predetermined period through the automated steering operation.

The peripheral information acquisition unit 22 includes a plurality of cameras 72 and a plurality of radars 74 that obtain peripheral information around the vehicle 10 required for performing the inter-vehicle distance control function, the lane keeping function, and the automated lane change function, for example. The camera 72 (periphery capture device) is, for example, a solid-state camera including a solid-state imaging element, such as a CCD camera or a CMOS camera (this camera may be an infrared camera). The camera 72 captures a peripheral image (real image) around the vehicle 10 including at least an area ahead of the vehicle 10 when viewed from the vehicle 10, and outputs an image signal corresponding to the peripheral image to the travel control ECU 32.

Here, the peripheral image around the vehicle 10 includes, in addition to a lane mark image that forms the lane (traffic lane) on a traveling road, another vehicle (obstacle) image and the like.

Note that the cameras 72 include, for example, a front photographing camera, a side photographing camera, and a rear photographing camera.

The radar 74 outputs transmission waves corresponding to electromagnetic waves (here, millimeter waves) to the outside including at least the area ahead of the vehicle 10 when viewed from the vehicle 10, and receives reflection waves of the transmission waves that have reflected from a detected object (for example, object such as another vehicle or a pedestrian). Then, a reflection signal (also referred to as a radar signal) corresponding to the reflection waves is output to the travel control ECU 32.

Note that the radars 74 include, for example, a front detection radar, a side detection radar, and a rear detection radar.

The reflection signal detected by the radar 74 includes, for example, obstacle information (direction information, distance information, relative speed information) of the obstacle such as another vehicle when viewed from the own vehicle 10.

The vehicle information acquisition unit 24 includes various sensors and various devices in order to acquire, in addition to information regarding whether the automated driving execution is necessary, vehicle operation information required for performing the inter-vehicle distance control function, the lane keeping function, and the automated lane change function, for example. Specifically, the vehicle information acquisition unit 24 includes an automated driving switch 77 as an automated driving indicator by which the driver H instructs whether the vehicle 10 performs the automated driving and a vehicle speed sensor 76 that detects the vehicle speed of the vehicle 10, and moreover, an acceleration sensor, a yaw rate sensor, a steering angle sensor, and the like that are not shown. Each sensor and each device output the acquired vehicle information to the travel control ECU 32.

The navigation device 26 detects a current position of the vehicle 10 using a satellite positioning device such as a GPS device, and shows a user (vehicle occupant) such as the driver H a route to a destination. In addition, the navigation device 26 includes a map information storage unit 44 that stores map information. The navigation device 26 detects the current position of the vehicle 10 on the basis of position information from the GPS satellite and the map information stored in the map information storage unit 44.

From the viewpoint of detecting the current position of the vehicle 10, the navigation device 26 can be regarded as another vehicle information acquisition unit 24. Moreover, the navigation device 26 can also be regarded as another peripheral information acquisition unit 22 that detects peripheral circumstance information corresponding to information regarding a peripheral circumstance around the vehicle 10, such as road traffic regulations or road restrictions around the current position of the vehicle 10.

Note that FIG. 1 shows a type in which the navigation device 26 is attached to the vehicle 10; however, the structure is not limited to this example. A portable information terminal such as a smartphone that performs intercommunication with the travel control ECU 32 can be used as the navigation device 26. Moreover, the map information may be stored in an external server (not shown) and provided for the navigation device 26 as necessary.

The driver camera 14 included in the driver state monitoring unit 12 captures an image of an upper half body including a head of the driver H, and outputs an image signal Si to the monitoring result determination ECU 20 and the device examination ECU 21. The driver camera 14 is preferably an infrared camera.

[Examination Method for Driver Camera 14]

FIG. 3 shows an examination result determination table 79 for the driver camera 14 that is stored by the device examination ECU 21 in a storage device, and a monitoring result determination table 80 for the driver camera 14 that is stored by the monitoring result determination ECU 20 in the storage device.

The device examination ECU 21 determines the examination result of the driver camera 14 on the basis of the image signal Si output from the driver camera 14 with reference to the examination result determination table 79.

With reference to this examination result determination table 79, the device examination ECU 21 examines whether the driver camera 14 is normal or abnormal on the basis of whether the image signal Si exists and a level (luminance distribution: including histogram) of the image signal Si.

The device examination ECU 21 examines and determines that the driver camera 14 is abnormal (is not normal) when the image signal Si is not received (no image signal Si) due to the disconnection of a signal line or the like, or when the level of the image signal Si is so high and saturated or is so low and insufficient even if the image signal Si is received, that is, even if the image signal Si exists (the image signal Si is present).

Note that, for example, while intense light directly enters the driver camera 14 through a lens, the level of the image signal Si may become so high and saturated. In addition, for example, if the lens of the driver camera 14 is dirty, underexposure may occur and the level of the image signal Si may become low.

As shown in the examination result determination table 79, when the level of the image signal Si is within a predetermined range, the device examination ECU 21 examines and determines that the driver camera 14 is normal (the monitoring device is normal and is not abnormal).

If the device examination ECU 21 examines and determines that the driver camera 14 is normal with reference to the monitoring result determination table 80, the monitoring result determination ECU 20 that monitors the state of the driver H analyzes, for example, a face direction and an open/closed state of eyelids of the driver H from an image obtained by the image signal Si. If the analysis result indicates that the face direction of the driver H is a looking aside direction (including a dozing state in which the eyelids are closed for a long time) so that it is determined that the automated driving should not be continued, the monitoring result determination ECU 20 determines that the result of monitoring the driver's state by the driver camera 14 is "not suitable" for performing the driving assistance function. In addition, if the driver H opens his eyelids and his face faces substantially ahead so that it is determined that the automated driving may be continued, the monitoring result determination ECU 20 determines that the result of monitoring the driver's state by the driver camera 14 is "suitable" for performing the driving assistance function.

Note that if it is determined that the examination result of the driver camera 14 is abnormal, the monitoring result determination ECU 20 determines that the monitoring result from the driver camera 14 is "not suitable".

The examination result as to whether the driver camera 14 is normal or abnormal is supplied from the device examination ECU 21 to the assistance degree determination unit 40 of the travel control ECU 32.

The monitoring result by the driver camera 14 as to whether the state of the driver H is suitable or not suitable is supplied from the monitoring result determination ECU 20 to the travel control ECU 32.

[Examination Method for Touch Sensor 18]

As illustrated in FIG. 2, the steering wheel 16 of the vehicle 10 includes a rim part 46 in an annular shape that is gripped by the driver H, and a connection part 50 that connects between an inner side of the rim part 46 in a radial direction and a steering shaft 48. The touch sensor 18 is formed at the rim part 46.

The rim part 46 has a layer structure and includes a core metal made of a metal material, a frame layer made of a resin material, a shield layer, and a sensor layer made of a conductive material that are not shown in this order from a central part to an outer side in the radial direction.

Figure 4:
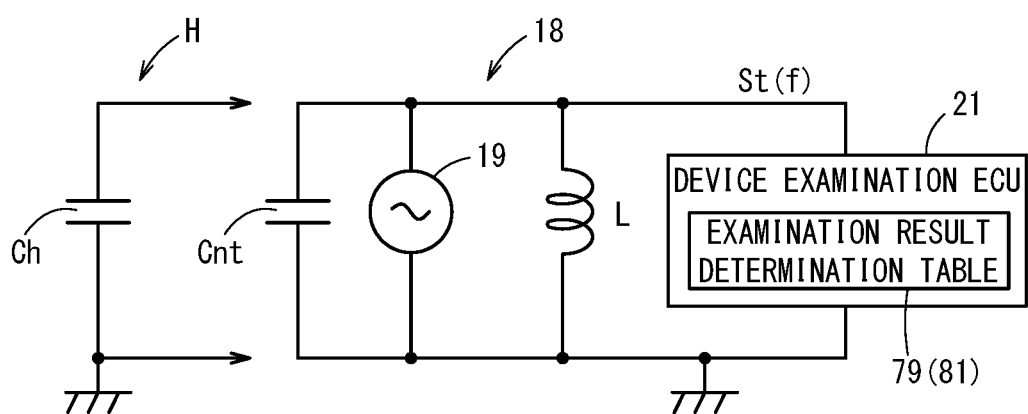
FIG. 4 is an equivalent circuit diagram of the driver (human body) and a touch sensor that is connected to the device examination ECU.

FIG. 4 is an equivalent circuit diagram of the driver H (human body) and the touch sensor 18 that is connected to the device examination ECU 21.

The touch sensor 18 of the driver state monitoring unit 12 includes an oscillator 19, and detects whether the driver H grips the steering wheel 16 by his hands on the basis of change of a frequency (oscillation frequency) f of the oscillator 19.

The touch sensor 18 outputs a touch signal (contact signal) St {also referred to as St(f)} corresponding to a detection signal having the frequency f to the monitoring result determination ECU 20 and the device examination ECU 21.

FIG. 5 shows an examination result determination table 81 for the touch sensor 18 that is stored by the device examination ECU 21 in the storage device, and a monitoring result determination table 82 for the touch sensor 18 that is stored by the monitoring result determination ECU 20 in the storage device.

The device examination ECU 21 measures the frequency f of the touch signal St using a frequency counter (not shown), and determines the examination result of the touch sensor 18 on the basis of the measured frequency f with reference to the examination result determination table 81.

Here, description is given concerning a correspondence relation between the value of the frequency (oscillation frequency) f of the touch signal St of the touch sensor 18, and whether the driver H grips or does not grip the steering wheel 16 (touch sensor 18) by his hands.

The frequency f based on an electrostatic capacitance C in a case where the driver H (human body) is not in contact with (does not grip) the sensor layer (to which oscillator 19 is connected) of the steering wheel 16 (touch sensor 18) (this electrostatic capacitance C is referred to as non-contact electrostatic capacitance Cnt) is referred to as a non-contact frequency fnt. The non-contact frequency fnt is expressed by the following expression (1):

$$fnt = \frac{1}{2}\pi(L \times Cnt)^{1/2} \quad (1)$$

where L is an inductance value of a coil that is connected to the oscillator 19.

The electrostatic capacitance C in a case where the driver H is in contact with (grips) the sensor layer of the steering wheel 16 (touch sensor 18) is a value that is obtained by adding an electrostatic capacitance Ch of the driver H to the non-contact electrostatic capacitance Cnt.

Thus, the frequency f (referred to as contact frequency ft) based on the electrostatic capacitance C (referred to as contact electrostatic capacitance Ct, Ct=Cnt+Ch) in the case where the driver H (human body) is in contact with (grips) the sensor layer of the steering wheel 16 (touch sensor 18) is expressed by the following expression (2):

$$ft = \frac{1}{2}\pi\{(L \times (Cnt+Ch)\}^{1/2} \quad (2)$$

In consideration of the expression (1) and the expression (2), it is understood that the contact frequency ft in the case where the driver H (human body) grips the steering wheel 16 (touch sensor 18) is lower than the non-contact frequency fnt in the non-gripping case (in the case where the driver H does not grip the steering wheel). That is to say, a relation of ft<fnt is satisfied.

Note that each of L, Cnt, and Ch varies; thus, even if this variation causes a variation in the frequency f, for example, Cnt is set to be lower than Ch (Cnt<Ch) so that the relation of ft<fnt is satisfied. That is to say, as the touch sensor 18, an electrostatic capacitance sensor that can detect whether the driver H grips the steering wheel 16 (touch sensor 18) by his hands on the basis of the oscillation frequency f of the oscillator 19 is used.

Moreover, when two vehicle occupants grip the steering wheel 16 (touch sensor 18), the contact electrostatic capacitance Ct increases abnormally (substantially, Ct=Cnt+2× Ch). In this case, the frequency f becomes an abnormal frequency (abnormal low frequency) fab that is lower than the normal contact frequency ft (see examination result determination table 81). That is to say, a relation of fab<ft is satisfied.

Furthermore, if the touch sensor 18 itself is broken, the frequency f becomes zero value or an abnormal frequency (abnormal high frequency) fab that is higher than the non-contact frequency fnt.

As above, description has been given concerning the correspondence relation between the value of the frequency (oscillation frequency) f of the touch signal St of the touch sensor 18, and whether the driver H grips or does not grip the steering wheel 16 (touch sensor 18) by his hands.

With reference to the examination result determination table 81, the device examination ECU 21 determines the examination result of the touch sensor 18 on the basis of whether the touch signal St exists and the frequency f when the touch signal St exists.

If the touch signal St is not received due to the disconnection of the signal line or the like (no touch signal St), or if the frequency f is the abnormal frequency fab even when the touch signal St is received, the device examination ECU 21 examines and determines that the touch sensor 18 is abnormal (monitoring device is broken).

If the frequency f of the touch signal St is the contact frequency ft or the non-contact frequency fnt, the device examination ECU 21 examines and determines that the touch sensor 18 is normal (monitoring device is normal).

If the device examination ECU 21 determines that the frequency f is the contact frequency ft, the monitoring result determination ECU 20 that monitors the state of the driver H determines that the monitoring result of the state of the driver H is preferable to continue the automated driving and is "suitable" for performing the driving assistance function with reference to the monitoring result determination table 82.

In addition, if the device examination ECU 21 determines that the frequency f is the non-contact frequency fnt or the abnormal frequency fab, the monitoring result determination ECU 20 determines that the monitoring result of the state of the driver H is not preferable to continue the automated driving and is "not suitable" for performing the driving assistance function.

The examination result as to whether the touch sensor 18 is normal or abnormal is supplied from the device examination ECU 21 to the assistance degree determination unit 40 of the travel control ECU 32.

The monitoring result as to whether the state of the driver H is suitable or not suitable by the frequency f of the touch sensor 18 is supplied from the monitoring result determination ECU 20 to the travel control ECU 32.

Note that the steering wheel 16 is not limited to a steering part in an annular shape as shown in FIG. 2, and may be replaced by, for example, a butterfly type, a joystick, a button, or the like.

Referring back to FIG. 1, the driving unit 28 includes the acceleration and deceleration device 62, the braking device 64, and the steering device 66.

The acceleration and deceleration device 62 includes an acceleration and deceleration ECU (acceleration and deceleration electronic control unit) (not shown) and a driving source of the vehicle 10, such as an engine (not shown) or a driving motor (not shown) whose operation is controlled by the acceleration and deceleration ECU.

The braking device 64 includes a brake ECU (brake electronic control unit) that is not shown and a brake actuator (not shown) whose operation is controlled by the brake ECU.

The steering device 66 includes an electric power steering ECU (electric power steering electronic control unit, hereinafter referred to as EPSECU) and an electric power steering device (hereinafter referred to as EPS) that are not shown.

The acceleration and deceleration device 62, the braking device 64, and the steering device 66 of the driving unit 28 operate based on the determination by the assistance degree determination unit 40 of the travel control ECU 32 in accordance with control instructions output from the ACC controller 34, the LKAS controller 36, and the ALC controller 38.

Note that the acceleration and deceleration device 62, the braking device 64, and the steering device 66 operate also in accordance with an operation of an accelerator pedal (not shown), an operation of a brake pedal (not shown), and an operation of the steering wheel 16 by the driver H, respectively.

The notification device 30 includes the display device 68, the speaker 70, and a notification ECU (notification electronic control unit) (not shown). In accordance with a notification instruction output from the travel control ECU 32, the notification ECU operates the display device 68 and the speaker 70. The display device 68 performs display regarding the automated driving, for example. The display device 68 may constitute a part of a meter of an instrument panel that is not shown, for example. The display device 68 may also serve as a display unit of the navigation device 26.

The ACC controller 34, the LKAS controller 36, and the ALC controller 38 independently or collaboratively perform control required for the travel of the vehicle 10 by the automated driving. For example, the ACC controller 34 outputs to the accelerator and decelerator ECU of the driving unit 28, an operation signal that relates to traveling following a preceding vehicle of the own vehicle 10 while keeping a predetermined inter-vehicle distance from the preceding vehicle; the LKAS controller 36 outputs to the EPSECU of the driving unit 28, an operation signal that prevents the vehicle 10 from going out of the traveling lane; and the ALC controller 38 outputs to the accelerator and decelerator ECU and the EPSECU of the driving unit 28, an operation signal that automatedly guides the own vehicle 10 from a current traveling lane (lane before changing lane) to a target lane.

Here, for example, the ALC controller 38 generates lane change information including a lane change trajectory on the basis of the vehicle information that indicates the state of the vehicle 10 obtained by the vehicle information acquisition unit 24, information that is obtained based on the vehicle information, and the information regarding the peripheral circumstance of the vehicle 10 obtained by the peripheral information acquisition unit 22. Then, the ALC controller 38 controls the acceleration and deceleration device 62, the braking device 64, and the steering device 66 so as to perform the automated lane change control of the vehicle 10 on the basis of the generated lane change information.

[Operation]

Next, with reference to a flowchart in FIG. 6, description is given concerning the relation between a switching operation for the diving assistance function of the vehicle 10 by the driving assistance device 11 according to the embodiment that is basically configured as described above and whether there is an abnormality in the driver camera 14 and the touch sensor 18 (abnormal or normal).

Note that it is the travel control ECU 32 and the function use possible/impossible determination unit 40 that execute the programs according to the flowchart. Since it is complicated to describe the execution subject in each process, the execution subject is described if necessary. To help understanding and avoid the complication, the monitoring result of the driver's state by the monitoring result determination ECU 20 on the basis of the image signal Si from the driver camera 14 and the touch signal St from the touch sensor 18 is basically "suitable" for performing the driving assistance function.

In step S1, the travel control ECU 32 determines whether the vehicle 10 is in the automated driving (the automated driving switch 77 is on and the vehicle 10 is traveling) (step S1: YES), or the vehicle 10 is starting the automated driving, that is, in a transition from an OFF state to an ON state of the automated driving switch 77 (step S1: YES), or the vehicle 10 is in the other cases (for example, the automated driving switch 77 is in the OFF state and the vehicle 10 is traveling) (step S1: NO). If the determination in step S1 is negative (step S1: NO), after a predetermined time, the process returns to the determination process in step S1 and the process is continued.

If it is determined that the vehicle 10 is in the automated driving or is starting the automated driving (step S1: YES), the assistance degree determination unit 40 acquires from the device examination ECU 21, the examination result as to whether the driver camera 14 is normal or abnormal, and the examination result as to whether the touch sensor 18 is normal or abnormal in step S2.

In step S2, in a case where, on the basis of the acquired examination result, it is recognized that both the driver camera 14 and the touch sensor 18 are normal (step S2: YES), if the monitoring result of the state of the driver H by the monitoring result determination ECU 20 using the driver camera 14 and the touch sensor 18 is "suitable", the assistance degree determination unit 40 determines that all the driving assistance functions, that is, the inter-vehicle distance control function, the lane keeping function, and the automated lane change function can be used. Then, in step S3, the automated driving by the controls using the ACC controller 34, the LKAS controller 36, and the ALC controller 38 of the travel control ECU 32 is allowed.

In step S3, if the vehicle 10 is in the automated driving, the travel control ECU 32 continues the automated driving (ACC function+LKAS function+ALC function), and if the vehicle 10 is starting the automated driving, an operation of the automated driving is started. After that, the process of and after step S1 is repeated.

Figure 7A:
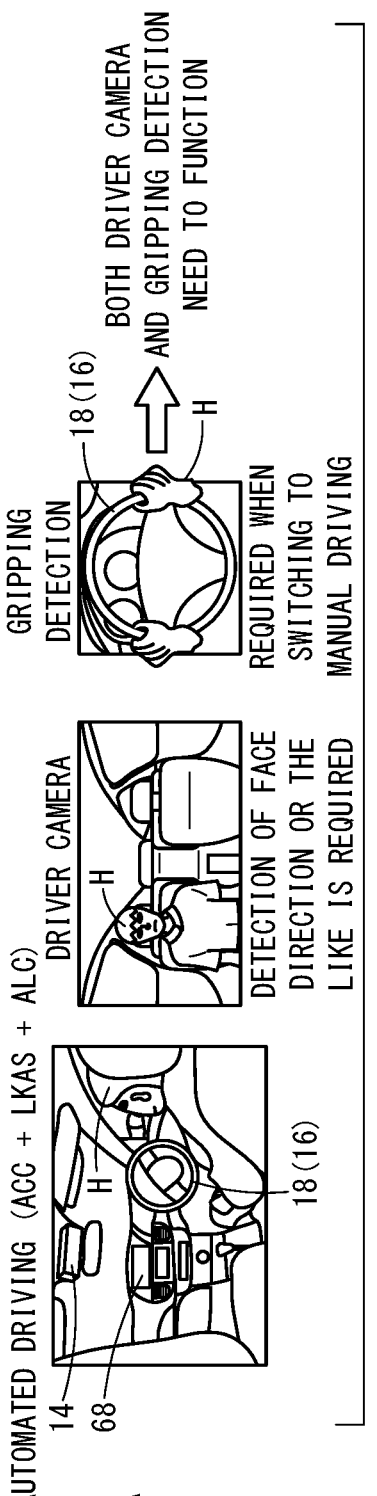
FIGS. 7A, 7B, and 7C are transition explanatory views showing whether driving assistance functions can be used.

As shown in transition explanatory views of the driving assistance functions in FIG. 7A, the automated driving (ACC function+LKAS function+ALC function) is performed in a case that both the detection of the face direction or the like of the driver H by the driver camera 14 and the gripping detection by the touch sensor 18 are functioning.

If the determination in step S2 is negative (step S2: NO), the assistance degree determination unit 40 determines whether the driver camera 14 is abnormal and the touch sensor 18 is normal in step S4.

Note that cases in which the determination in step S2 is negative are the following cases: (driver camera 14: abnormal, touch sensor 18: normal); (driver camera 14: normal, touch sensor 18: abnormal); and (driver camera 14: abnormal, touch sensor 18: abnormal).

In the determination in step S4, if the driver camera 14 is abnormal and the touch sensor 18 is normal (step S4: YES), the notification instruction indicating the determination result in step S4 is transmitted to the notification device 30 through the notification controller 42 in step S5.

Accordingly, the notification device 30 causes the display device 68 and the speaker 70 to notify that: the driver camera 14 is abnormal; and the driving assistance function makes a transition to or starts not the automated driving (ACC function+LKAS function+ALC function) but an assistance driving (ACC function+LKAS function) in which a low speed following automated traveling function {(also referred to as TJA: Traffic Jam Assist function) or the like can be performed.

Next, if it is recognized that the driver camera 14 is abnormal and the touch sensor 18 is normal (step S4: YES) from the acquired examination result, the assistance degree determination unit 40 determines that the inter-vehicle distance control function and the lane keeping function can be used and the assistance driving (ACC function+LKAS function) by the controls using the ACC controller 34 and the LKAS controller 36 of the travel control ECU 32 is allowed in step S6.

Figure 7B:
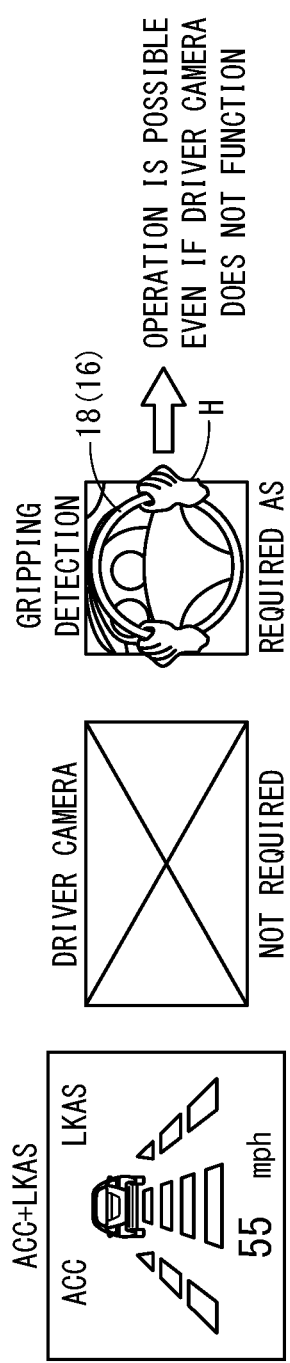

As shown in transition explanatory views of the driving assistance functions in FIG. 7B, the assistance driving (ACC function+LKAS function) can be performed in a case that the gripping detection by the touch sensor 18 is functioning even if the driver camera 14 does not function.

If the determination in step S4 is negative (step S4: NO), that is, (driver camera 14: normal, touch sensor 18: abnormal) or (driver camera 14: abnormal, touch sensor 18: abnormal), the notification instruction indicating the determination result in step S4 is transmitted to the notification device 30 through the notification controller 42 in step S7.

Accordingly, the notification device 30 issues notification of the determination result in step S4 (state of monitoring device) by display and voice, and causes the display device 68 and the speaker 70 to notify that the vehicle 10 makes a transition from the automated driving (ACC function+LKAS function+ALC function) or the assistance driving (ACC function+LKAS function) to only the ACC function, or starts the operation with only the ACC function.

Figure 7C:
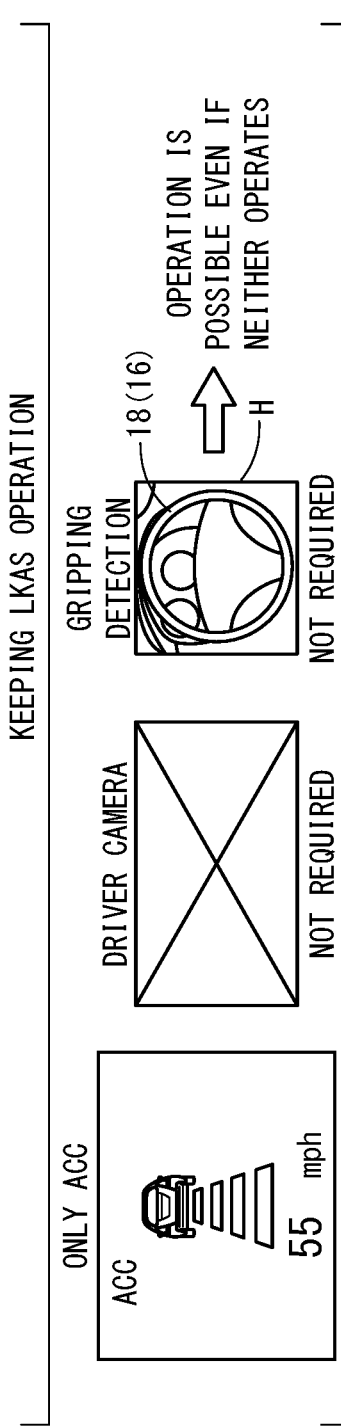

As shown in transition explanatory views of the driving assistance function in FIG. 7C, the assistance driving (ACC function) can be performed using the cameras 72 and the radars 74 of the peripheral information acquisition unit 22 even if the driver camera 14 and the touch sensor 18 do not function.

SUMMARY OF EMBODIMENT

As described above, the driving assistance device 11 according to this embodiment includes: the plurality of monitoring devices, such as the driver camera 14 and the touch sensor 18, that is provided for the vehicle 10 and configured to monitor the state of the driver H; the device examination ECU 21 configured to examine whether the monitoring devices are normal or abnormal; and the assistance degree determination unit (function use possible/impossible determination unit) 40 configured to determine the degree of the possible assistance of the driving assistance functions (usable or not, its kind) on the basis of the examination result from the device examination ECU 21.

In this manner, the device examination ECU 21 examines whether the monitoring devices that monitor the state of the driver H are normal or abnormal. On the basis of the examination result, the assistance degree determination unit (function use possible/impossible determination unit) 40 determines the degree of the possible assistance of the driving assistance functions (usable or not). Therefore, the driving assistance by the vehicle 10 for the driver H is cancelled less easily.

Note that the state of the driver H can be accurately monitored by the driver camera 14 that photographs the driver H and the touch sensor 18 that is provided for the steering wheel 16 which is gripped and operated by the driver H.

Then, the assistance degree determination unit (function use possible/impossible determination unit) 40 is configured to determine that all the driving assistance functions of the inter-vehicle distance control function, the lane keeping function, and the automated lane change function can be used when the device examination ECU 21 determines that both the driver camera 14 and the touch sensor 18 are normal (step S2: YES). In this case, the automated driving function in which the acceleration and deceleration operation, the steering operation, and the braking operation by the driver H are not required can be performed in a state where a desired driver's state detection function is secured.

Moreover, the assistance degree determination unit (function use possible/impossible determination unit) 40 is configured to determine that at least one of the lane keeping function and the low speed following automated traveling function (inter-vehicle distance control function+lane keeping function) can be used (step S4: YES) when the device examination ECU 21 determines that the driver camera 14 is abnormal and the touch sensor 18 is normal.

Accordingly, if at least the touch sensor 18 is normal, the lane keeping function or the low speed following automated traveling function can be used. Therefore, even if the driver camera is abnormal, for example, the lane keeping function or the low speed following automated traveling function can be performed, whose desired driver's state detection function is not affected.

Note that the assistance degree determination unit (function use possible/impossible determination unit) 40 is configured to determine that the inter-vehicle distance control function that can operate without depending on a driver's state detection result can be used even when the device examination ECU 21 determines that one of or both the driver camera 14 and the touch sensor 18 are abnormal. Therefore, the convenience can be improved.

The vehicle 10 according to the present invention is not limited to the embodiment above, and can employ various structures without departing from the gist of the present invention. For example, instead of the touch sensor 18 that is the electrostatic capacitance type, a pressure sensor may be used.

The invention claimed is:

1. A driving assistance device comprising:
   a plurality of monitoring devices that are provided for a vehicle and configured to monitor a state of a driver, and include a driver camera configured to photograph the driver, and a touch sensor that is provided for a steering part operated by the driver;

a device examination unit configured to examine whether the monitoring devices are normal or abnormal; and an assistance usability determination unit configured to determine whether a driving assistance function is usable on a basis of an examination result from the device examination unit, the driving assistance function including automated driving functions automatically controls an inter-vehicle distance control function, a lane keeping function and an automated lane change function, wherein the inter-vehicle distance control function controls an inter-vehicle distance from a preceding vehicle in a lane in which the vehicle is traveling, the lane keeping function recognizes the lane in which the vehicle is traveling and controls the vehicle to keep traveling in the lane without going out of the lane, the automated lane change function automatically controls steering of the vehicle to change lanes within a predetermined period of time from the lane in which the vehicle is traveling to another lane, the assistance usability determination unit is configured to determine that all the inter-vehicle distance control function, the lane keeping function and the automated lane change function can be used if both the driver camera and the touch sensor are normal, the assistance usability determination unit is configured to suspend the automated lane change function if the driver camera is abnormal, the assistance usability determination unit is configured to suspend the lane keeping function and the automated lane change function if the touch sensor is abnormal, and the assistance usability determination unit is configured to determine that the inter-vehicle distance control function can be used even when the driver camera and the touch sensor are abnormal.

2. The driving assistance device according to claim 1, wherein:

the driving assistance function includes a low speed following automated traveling function; and the assistance usability determination unit is configured to determine that at least one of the lane keeping function and the low speed following automated traveling function can be used when the device examination unit determines that at least the touch sensor is normal.

* * * * *